United States Patent Office 3,357,962
Patented Dec. 12, 1967

3,357,962
HOMO- AND COPOLYMERIZATION OF VINYL MONOMERS USING TAUTOMERIC ANHYDRIDE OR KETONE DERIVATIVES AS CATALYSTS
Heinrich Hopff, Zurich, Switzerland, and Eduard Kleiner, Ardsley, N.Y., assignors to Deutsche Gold- und Silber-Scheideanstalt vormals Roessler, Frankfurt am Main, Germany
No Drawing. Filed Nov. 10, 1964, Ser. No. 410,304
Claims priority, application Germany, Nov. 14, 1963, D 42,934
6 Claims. (Cl. 260—89.5)

The present invention relates to an improved process for the homo- or copolymerization of vinyl monomers.

It is known that vinyl monomers can be polymerized in bulk with radical forming catalysts. Such polymerized vinyl compounds are of great interest for the production of organic glasses. One disadvantage in the known polymerization process resides in the fact that the bulk polymerization can only be caused to progress uniformly with great difficulty and usually tends to an uncontrolled progress of the polymerization which greatly reduces the quality of the organic glasses obtained. In order that the polymerization could be controlled to some extent only very small quantities of radical forming catalysts were employed. The quantities were so small that the time required for the polymerization was very long, and for many technical applications too long.

An object of the invention is to provide for a polymerization of vinyl monomers which proceeds rapidly under daylight or exclusion of light but which is controllable during every moment thereof so that clear and streak free products are obtained.

According to the invention it was found that bubble and streak free products could be obtained if the homo- or copolymerization of vinyl monomers is carried out in the presence of at least one tautomeric compound of the formulae:

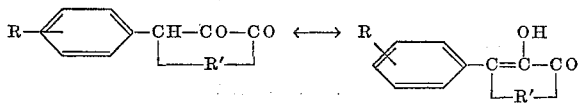

in which:

R = hydrogen, alkyl of 1–3 carbon atoms, hydroxyl alkyl 1–3 carbon atoms, hydroxy, amino or halogen.

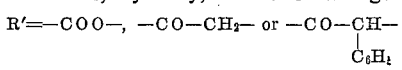

Esters and amides of acrylic or methacrylic acid and especially methyl methacrylate above all come into consideration as the vinyl monomers to be polymerized according to the invention. However, rapid and controllable polymerization of other vinyl monomers, such as, for example, acrylonitrile, vinyl carbazole, vinylpyrrolidone, vinyl chloride, vinylidene chloride and styrene can also be effected with the catalysts according to the invention.

Suitable catalysts according to the invention, for instance are: phenyloxalacetic anhydride, tolyloxalacetic acid anhydride, phenylcyclopentatrione and oxalyldibenzyl ketone; phenylovalacetic anhydride and oxalyldibenzyl ketone are particularly effective.

The quantities of the catalysts employed according to the invention can be varied within wide limits and lie between 0.001 and 10% by weight with reference to the vinyl monomer to be polymerized. It is surprising that catalyst quantities of 10% by weight do not lead to an explosive course of polymerization as is the case with peroxide and azo compound catalysts.

In addition, the catalysts employed according to the invention can be used at practically any desired temperature, even higher temperatures. The polymerization temperatures do not depend upon the polymerization catalyst as is the case with peroxidic and azo catalysts, which decompose at higher temperatures, but are governed by the particular vinyl monomer concerned. The polymerization time therefore can be shortened by the use of elevated temperatures.

It was furthermore found that the polymerization initiating action of the catalysts according to the invention could be increased substantially by irradiation with U.V. light but that, on the other hand, room light or exclusion of light has little influence. Nevertheless, the catalysts according to the invention have the advantage over pure photosensitizers that even under the exclusion of light a polymerization accelerating effect is attained which leads to good polymerization yields. This effect is favored by a slight increase in temperature to, for example, 70–80° C.

The presence of oxygen has different influences on the catalytic effect achieved, depending upon whether the catalyst is present in keto or enol form. Whereas the catalyst effect of the keto form is increased by the exclusion of oxygen, traces of oxygen had to be present if the enol form is to have its maximum polymerization initiating action.

It is also of interest that the degree of purity of the vinyl monomers to be polymerized is of influence on the catalytic effectiveness of the catalysts according to the invention. It was found that the conversions with usual commercial, stabilized vinyl monomers with the catalysts according to the invention, whether in keto or in enol form, were higher than with freshly distilled monomers. It is possible therefore to polymerize commercial vinyl monomers directly with the catalysts according to the invention without the necessity of first subjecting them to a time consuming distillation.

Because of a certain sensitivity to oxidation, the catalysts are stored in admixtures with plasticizers.

The catalysts according to the invention are preferably used in bulk polymerization but they also can be used in solution, precipitation, emulsion or suspension polymerizations.

The catalysts according to the invention are suited for homo- and copolymerization of vinyl monomers and therefore the vinyl monomers can either be polymerized with themselves or copolymerized with other vinyl monomers. The polymerizations concerned herein therefore only involve vinyl monomers as the polymerizable component or components and do not concern, for example, copolymerization of vinyl monomers with unsaturated polyester resins. The term vinyl monomers is employed herein to signify monomers which undergo vinyl polymerization and contain a terminal

group.

The catalysts employed according to the invention can also be used in combination with the usual catalysts, such as, peroxides or azo compounds. Naturally the latter can only be employed in very small quantities in order to avoid an explosive course of reaction.

Infra red spectra of polymethyl methacrylate which had been polymerized at 80° C. in bulk with 0.5% by weight of catalyst with reference to the starting monomer indicates that the polymethacrylates obtained were atactic. They are equal to those obtained at higher temperatures with radical forming catalysts, such as benzoyl peroxide. The molecular weights, determined in the Ostwald-viscosimeter (capillary 0.4 mm.) at 20° C. in benzene were 2.5 to 3.5 million as contrasted to molecular weights around 1.3 million in polymethyl methacrylates polymerized with benzoyl peroxide.

The following examples will serve to illustrate the present invention with reference to several embodiments thereof. The proportions are given by weight unless otherwise specified.

*Example 1*

20 g. samples of methyl methacrylate which had been distilled in a silver plated high vacuum insulated distillation column 50 cm. high at about 50° C. under vacuum were each weighed into a reaction vessel with 0.5% of the catalysts given in the following Table 1. Subsequently the reaction vessel which was provided with a reflux condenser was rinsed 5 minutes with 99.999% nitrogen and then dipped into a thermostatically controlled jacket provided with a sealing liquid which maintained the polymerization temperature constant to ±0.1° C. About every 15 minutes a small sample was pipetted out of the methyl methacrylate solution, which was maintained homogeneous by a magnetic stirrer, and such sample cooled to 20° C. and the refractive index determined at 20° C. This method permitted conversions up to about 10 to 12% to be determined. With higher conversions homogeneous distribution could not be maintained in the polymerization vessel even with the aid of a magnetic stirrer. During the entire polymerization period a slight superatmospheric pressure was maintained in the system so that no air could enter. The results showed good reproducibility.

The refractive indices were exactly determined to four places with a Zeiss-Abbe-Refractometer Model A which was thermostatted to 20° C. by a Colora-Ultra-Thermostat Type K. The calculation of the conversion to polymethyl methacrylate from the refractive index $n_D^{20}$ was according to the formula employed by V. W. Smith (J. Amer. Chem. Soc. 68, 2059 (1946)), namely:

percent polymethyl methacrylate = $1.22 \times 10^3 \times n_D^{20}$ wherein $n_D^{20}$ = the difference between the refractive index of the monomer solution (inclusive of catalyst) and the refractive index of the monomer polymer solution after a certain polymerization period.

TABLE 1

| Catalyst $R-C_6H_4-CH-CO-CO$ $\underset{R'}{\underbrace{\qquad}}$ 0.5% | R | R' | Percent Poly-MMA after 1 hr. at 80° C. |
|---|---|---|---|
| Phenyloxalacetic acid anhydride. | —H | —CO—O— | 4.9* |
| Phenylcyclopentatrione (Yellow Modif.). | —H | —CO—CH$_2$ | 0.9* |
| Oxalyldibenzyl ketone | —H | —CO—CH— $\quad\ \ $ \| $\quad\ \ $ C$_6$H$_5$ | 5.8* |
| Tolyloxalacetic acid anhydride. | —CH$_3$ | —CO—O— | 5.5 |
| Control without catalyst | | | 0.1 |

* Catalysts with own yellow color.

We claim:

1. In a process for the polymerization of at least one vinyl monomer containing a terminal $CH_2=C<$ group, the step of carrying out such polymerization in contact with a catalytically effective amount of at least one tautomeric compound of the formulae:

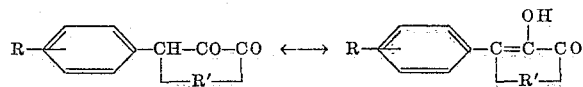

in which R is selected from the group consisting of hydrogen, alkyl of 1–3 carbon atoms, hydroxy alkyl 1–3 carbon atoms, amino and halogen and R' is selected from the group consisting of

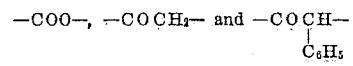

2. The process of claim 1 in which the quantity of said tautomeric compound employed is 0.001 to 10% by weight with reference to the monomer to be polymerized.

3. The process of claim 1 in which phenyloxalacetic acid anhydride is used as the tautomeric compound.

4. The process of claim 1 in which oxalyldibenzyl ketone is used as the tautomeric compound.

5. The process of claim 1 in which the monomer is a lower alkyl ester of methacrylic acid.

6. The process of claim 1 in which the monomer is methyl methacrylate.

No references cited.

JOSEPH L. SCHOFER, *Primary Examiner.*

H. W. WONG, *Assistant Examiner.*